(12) United States Patent
Hamamoto

(10) Patent No.: US 8,622,397 B2
(45) Date of Patent: Jan. 7, 2014

(54) OIL SEAL

(75) Inventor: Kokichi Hamamoto, Fukushima (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 13/820,875

(22) PCT Filed: Mar. 17, 2011

(86) PCT No.: PCT/JP2011/056333
§ 371 (c)(1),
(2), (4) Date: Mar. 5, 2013

(87) PCT Pub. No.: WO2012/049867
PCT Pub. Date: Apr. 19, 2012

(65) Prior Publication Data
US 2013/0175764 A1     Jul. 11, 2013

(30) Foreign Application Priority Data

Oct. 12, 2010 (JP) ................................. 2010-229482

(51) Int. Cl.
*F16J 15/32* (2006.01)
(52) U.S. Cl.
USPC ............ 277/568; 277/551; 277/562; 277/572
(58) Field of Classification Search
USPC .......................... 277/549, 551, 562, 568, 572
See application file for complete search history.

(56) References Cited

U.S. PATENT DOCUMENTS

| | | | | |
|---|---|---|---|---|
| 6,293,558 B1 * | 9/2001 | Crapart | ......................... | 277/552 |
| 6,357,754 B1 * | 3/2002 | Rieder et al. | .................. | 277/394 |
| 6,601,855 B1 * | 8/2003 | Clark | ............................. | 277/549 |
| 7,959,157 B2 * | 6/2011 | Dobbs et al. | .................. | 277/551 |
| 2008/0223450 A1 | 9/2008 | Kino et al. | | |

FOREIGN PATENT DOCUMENTS

| | | |
|---|---|---|
| DE | 10-2008-013105 A1 | 10/2008 |
| JP | 48-31158 | 9/1973 |
| JP | 4-74773 | 6/1992 |
| JP | 10-089487 A | 4/1998 |
| JP | 2002-022028 A | 1/2002 |
| JP | 3138507 | 12/2007 |
| JP | 2008-255979 A | 10/2008 |

* cited by examiner

*Primary Examiner* — Gilbert Lee
(74) *Attorney, Agent, or Firm* — Harness, Dickey & Pierce, P.L.C.

(57) ABSTRACT

An oil seal has a first seal member including a main lip and a first dust lip, and a second seal member installed in a machine outer side of the first seal member. The second seal member integrally has an end surface covering section covering an end surface section of a housing, an outer peripheral insertion section inserted from one side in an axial direction to an outer peripheral surface of the housing and engaged with a stepped engagement section in the outer peripheral surface of the housing so as to prevent the second seal member from coming off from the housing, an inner peripheral insertion section inserted to an inner peripheral surface of the shaft hole in the housing from one side in the axial direction, and a second dust lip slidably coming into close contact with the shaft in the machine outer side of the first dust lip.

2 Claims, 3 Drawing Sheets

OIL SEAL

CROSS-REFERENCE TO RELATED APPLICATIONS

This application is a U.S. National Stage Application of International Application No. PCT/JP2011/056333 filed on Mar. 17, 2011, and published in Japanese as WO 2012/049867 A1 on Apr. 19, 2012. This application claims priority to Japanese Application No. 2010-229482 filed on Oct. 12, 2010. The disclosures of the above applications are incorporated herein by reference.

BACKGROUND OF THE INVENTION

1. Field of the Invention

The present invention relates to an oil seal which is one kind of a sealing device. The oil seal according to the present invention is used, for example, as a shaft seal in a power steering section of a vehicle such as a motor vehicle or the like, or is employed in the other general industrial machines and the like.

2. Description of the Conventional Art

Historically, as an oil seal which has been used as the shaft seal in the power steering section of the vehicle such as the motor vehicle, an oil seal 51 shown in FIG. 3 has been known, and the oil seal 51 has a main lip 52 which is arranged toward an inner side A of the machine in an installed state and seals a sealed fluid such as an oil or the like, and a dust lip 53 which is arranged toward an outer side B of the machine and seals a foreign material such as a muddy water or the like (refer to Japanese Unexamined Patent Publication No. 2002-22028).

However, since a shaft is a vertical shaft in the case that the oil seal 51 is installed to an actual machine, the dust lip 53 is arranged in such a manner that a leading end of the lip is directed upward.

On the other hand, in a region in which a road improvement is not sufficient, for example, regions in foreign countries, a dust environment is severe and there is a case that the vehicle travels in a state in which the power steering section is temporarily submerged. In the case mentioned above, the muddy water is piled up in an upper part of the dust lip 53, in the oil seal 51. Accordingly, there is a problem that the muddy water entering from the dust lip 53 bites into the main lip 52 so as to cause an oil leakage.

SUMMARY OF THE INVENTION

Problem to be Solved by the Invention

The present invention is made by taking the points mentioned above into consideration, and an object of the present invention is to provide an oil seal which can inhibit a muddy water from being piled up in an upper part of a dust lip which is arranged in an outer side of the machine, whereby it is possible to enhance a sealing performance, particularly a muddy water resistance.

Means for Solving the Problem

In order to achieve the object mentioned above, according to a first aspect of the present invention, there is provided an oil seal comprising:

a first seal member which is installed to an inner periphery of a shaft hole in a housing inserting a shaft thereto; and a second seal member which is installed to an end surface section of the housing in an opening peripheral edge section of the shaft hole, wherein the first seal member integrally has an affixation section which is fitted to an inner peripheral surface of the shaft hole in the housing, a main lip which slidably comes into close contact with a peripheral surface of the shaft so as to seal a sealed fluid in an inner side of the machine, and a first dust lip which slidably comes into close contact with the peripheral surface of the shaft so as to seal a foreign material such as a muddy water in the outer side of the machine, and wherein the second seal member integrally has an end surface covering section which covers the end surface section of the housing, an outer peripheral insertion section which is inserted from one side in an axial direction to an outer peripheral surface of the housing and is engaged with a stepped engagement section provided in the outer peripheral surface of the housing so as to prevent the second seal member from coming off from the housing, an inner peripheral insertion section which is inserted to the inner peripheral surface of the shaft hole in the housing from one side in the axial direction, and a second dust lip which slidably comes into close contact with a peripheral surface of the shaft in the outer side of the machine in the first dust lip so as to seal the foreign material such as the muddy water in the outer side of the machine.

Further, an oil seal according to a second aspect of the present invention is the oil seal described in the first aspect mentioned above, wherein an outer peripheral surface of the outer peripheral insertion section in the second seal member is integrally provided with a third dust lip which slidably comes into close contact with an inner peripheral surface of a dust cover affixed to the shaft so as to seal the foreign material such as the muddy water in the outer side of the machine.

Further, an oil seal according to a third aspect of the present invention is the oil seal described in the first aspect or the second aspect mentioned above, wherein the second seal member is constructed by an integrally formed product of a rubber-like elastic body and is structured such that a metal ring is embedded in the inner peripheral insertion section.

Further, an oil seal according to a fourth aspect of the present invention is the oil seal described in the first aspect or the second aspect mentioned above, wherein the second seal member is constructed only by in integrally formed product of a rubber-like elastic material.

Further, an oil seal according to a fifth aspect of the present invention is the oil seal described in any one of the first to fourth aspects mentioned above, wherein the shaft is constructed by a steering shaft, and the oil seal is used as an oil seal for a steering wheel.

In the oil seal according to the present invention having the structure mentioned above, the second seal member is provided in the outer side of machine in the first seal member having the affixation section, the main lip, and the first dust lip, and the second seal member is structured such as to integrally have the end surface covering section which covers the end surface section of the housing, the outer peripheral insertion section which is inserted from the one side in the axial direction to the outer peripheral surface of the housing and is engaged with the stepped engagement section provided in the outer peripheral surface of the housing so as to prevent the second seal member from coming off from the housing, the inner peripheral insertion section which is inserted to the inner peripheral surface of the shaft hole in the housing from the one side in the axial direction, and the second dust lip which slidably comes into close contact with the peripheral surface of the shaft in the outer side of the machine in the first dust lip so as to seal the foreign material such as the muddy water in the outer side of the machine. Therefore, since the second seal member having the structure mentioned above is installed so as to cover the end surface section of the housing and the opening section of the shaft hole in the outer side of the machine in the first seal member, it is possible to seal the foreign material such as the muddy water by the second seal member, and it is possible to inhibit the foreign material such as the muddy water from being piled up on the first dust lip.

Further, since the outer peripheral surface of the outer peripheral insertion section in the second seal member is integrally provided with the third dust lip which slidably comes into close contact with the inner peripheral surface of the dust cover affixed to the shaft so as to seal the foreign material such as the muddy water in the outer side of the machine, the foreign material such as the muddy water reaching the second dust lip is reduced, and a sealing performance is further improved.

It is preferable that the second seal member is constructed by the integrally formed product of the rubber-like elastic body and is structured such that the metal ring for fitting to the inner peripheral surface of the shaft hole in the housing is embedded in the inner peripheral insertion section. Accordingly, the second seal member is firmly affixed to the housing and is hard to be detached from the housing. However, the metal ring may be omitted, and in this case, it is possible to achieve a reduction of a manufacturing cost and an easiness of an installing work.

In the present invention, the shaft is constructed, for example, by the steering shaft, and in this case, the oil seal is used as the oil seal for the steering wheel. Therefore, in the technical field relevant to the shaft seal of the steering section, the effects of the present invention can be achieved.

Effect of the Invention

The present invention achieves the following effects.

In other words, in the present invention, as mentioned above, since the second seal member integrally having the end surface covering section, the outer peripheral insertion section, the inner peripheral insertion section and the second dust lip is installed to the outer side of the machine in the first seal member having the affixation section, the main lip and the first dust lip, it is possible to seal the foreign material such as the muddy water by the second seal member, and it is possible to inhibit the foreign material such as the muddy water from being piled up on the first dust lip. Therefore, it is possible to inhibit the muddy water from being piled up on the first dust lip, inhibit the muddy water entering from the first dust lip from biting into the main lip and inhibit the oil leakage from being generated.

Further, in the case that the third dust lip coming into close contact with the dust cover is integrally provided in the outer peripheral surface of the outer peripheral insertion section in the second seal member, the foreign material such as the muddy water reaching the second dust lip is reduced, and it is possible to further improve the sealing performance.

In the case that the second seal member is constructed by the integrally formed product of the rubber-like elastic body and is structured such that the metal ring is embedded in the inner peripheral insertion section, it is possible to stabilize an affixing performance in relation to the housing, and in the case that the second seal member is constructed only by the integrally formed product of the rubber-like elastic body while omitting the metal ring, it is possible to achieve a cost reduction and an easiness of an installing work with regard to the second seal member.

Further, in the case that the oil seal is used as the oil seal for the steering wheel, the effects of the present invention can be achieved in the technical field relevant to the shaft seal of the steering section.

DETAILED DESCRIPTION OF PREFERRED EMBODIMENTS

The following embodiments are included in the present invention (1)

The present invention relates to an oil seal for a power steering wheel.

(2)

(2-1) In the prior art, the oil seal is fitted to the housing, and plays a role in sealing the internal oil and preventing the external dust from entering. The shaft oscillates together with a motion of the steering wheel, and the dust cover is affixed to the shaft in the atmospheric side of the oil seal.

(2-2) The oil seal is constructed by the metal ring, the rubber and the spring, and is constructed by the main lip sealing the oil, the dust lip preventing the external dust from entering, and the fitting section affixing the oil seal to the housing.

(2-3) In the region in which the road improvement is not sufficient, for example, the regions in foreign countries, the dust environment is severe and there is a case that the vehicle travels in a state in which the power steering section is temporarily submerged. In the prior art, there is the problem that the muddy water entering from the gap between the dust cover and the housing bites into the main lip section so as to cause the oil leakage.

(3)

(3-1) Accordingly, the present invention is structured as follows.

(3-2) In other words, in the prior art, in the case that the muddy water environment is severe, the muddy water flows into the oil seal section from the gap between the dust cover and the housing, and the muddy water is piled up in the housing recess section in the atmospheric side of the dust lip. Therefore, the muddy water enters into the main lip section due to lack of the muddy water resistance in the dust lip, and the main lip bites the dust, whereby the oil leakage is generated.

(3-3) On the contrary, the present invention is structured such that the atmospheric side surface of the housing is covered with the dust seal so as to prevent the muddy water from being piled on the housing recess section in the atmospheric side of the oil seal. Further, in order to further improve the muddy water resistance, the outer peripheral lip having a fastening margin in relation to the dust cover is provided in the outer peripheral side of the dust seal, for inhibiting the muddy water from entering from the section between the dust cover and the housing.

Figure 1:
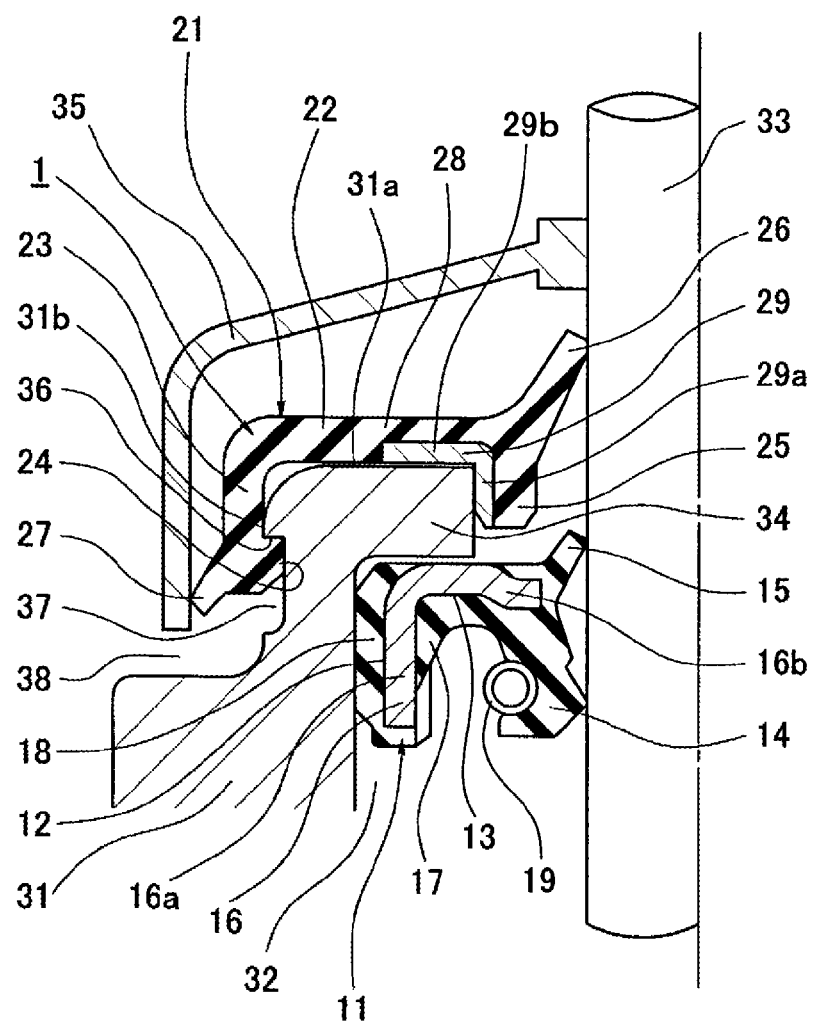
FIG. 1 is a cross sectional view of a substantial part of an oil seal according to a first embodiment of the present invention.

(3-4) The oil seal in FIG. 1 of the present invention is of a type that the oil seal is affixed to the inner peripheral side of the housing by the dust seal metal ring, and is fitted to the outer peripheral groove section of the housing in the inner peripheral side, and is excellent in a dust seal affixing property.

Figure 2:
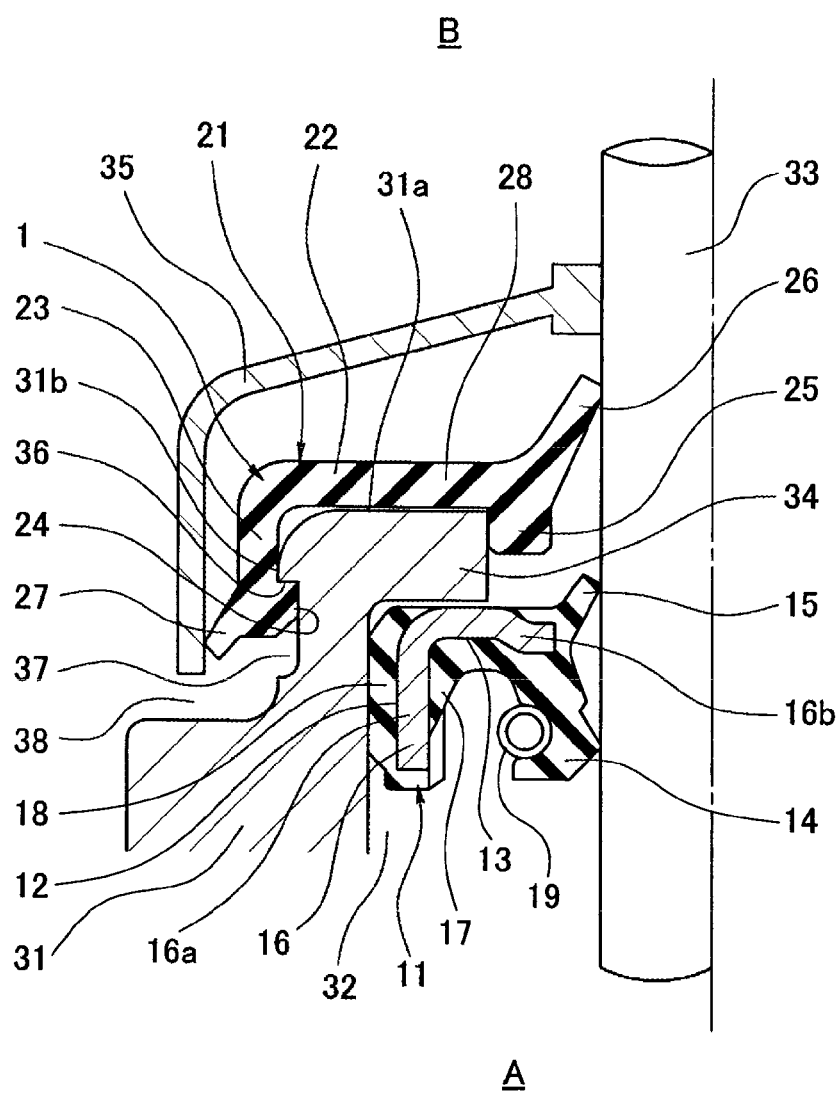
FIG. 2 is a cross sectional view of a substantial part of an oil seal according to a second embodiment of the present invention.
Figure 3:
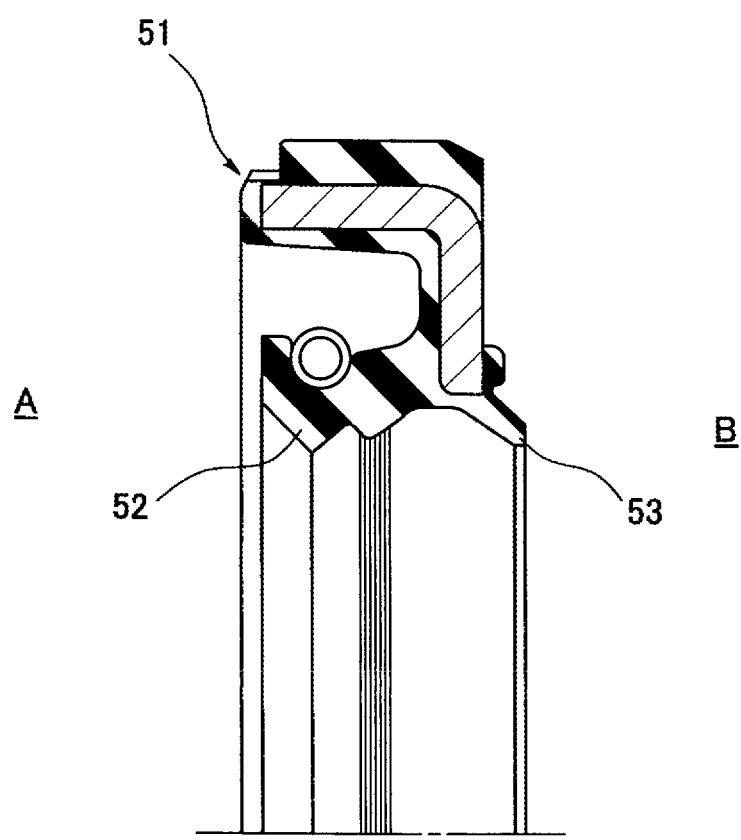
FIG. 3 is a cross sectional view of an oil seal according to a prior art.

(3-5) The oil seal in FIG. 2 of the present invention is structured as a rubber-only type that the oil seal is fitted to the outer peripheral groove section of the housing, for reducing a cost, and is structured such that an installing property of the dust seal is made easy at the same time of the reduction of cost.

(4) According to the technique of the present invention, the dust (muddy water) resistance is improved, it is possible to inhibit the muddy water from entering into the main lip section even in the case that the dust (muddy water) environment is severe, and it is possible to solve the oil leakage caused by the dust biting. Therefore, it is possible to obtain an effect that a long service life of the vehicle can be achieved.

Embodiments

Next, a description will be given of embodiments according to the present invention with reference to the accompanying drawings.

First Embodiment

FIG. 1 shows a cross section of a substantial part of an oil seal 1 according to a first embodiment of the present invention. The oil seal 1 according to the embodiment is constructed by a combination of a first seal member (which may be also called as an oil seal main body) 11 which is installed to an inner periphery of a shaft hole 32 of a housing 31, and a second seal member (which may be also called as a dust seal) 21 which is installed to an end surface section of the housing 31 in an opening peripheral edge section of the shaft hole 32, and is structured as follows. In this case, a shaft 33 inserted to the shaft hole 32 is a vertical shaft, and is specifically a steering shaft in a power steering section of a vehicle such as a motor vehicle. A lower side of the drawing is a machine inner side A and an upper side is a machine outer side B. An inward (a diametrically inward) flange section 34 is integrally provided in an opening peripheral edge section of the shaft hole in an end section of the machine outer side of the housing 31, and the first seal member 11 is installed to the flange section 34 in a state in which the first seal member is struck its end surface against the flange section from the machine inner side A. On the other hand, the second seal member 21 is installed like a cap from the machine outer side B in such a manner as to cover an end surface section (an upper surface section) of the flange section 34, that is, an end surface section (an upper surface section) of the housing 31. A dust cover 35 is attached to an outer peripheral surface of the shaft 33 so as to be positioned further in the machine outer side B of the flange section 34.

The first seal member 11 has a tubular affixation section 12 which is affixed (fitted) to an inner peripheral surface of the shaft hole 32 of the housing 31 in the machine inner side A of the flange section 34, a flange-shaped lip retaining section 13 is integrally provided from an end section in the machine outer side of the affixation section 12 toward an inner side in a diametrical direction, a plurality of seal lips 14 and 15 are integrally provided in an inner peripheral end section of the lip retaining section 13, and a main lip 14 and a first dust lip 15 are integrally provided as the seal lip, the main lip 14 sealing an oil in the machine inner side A, and the first dust lip 15 sealing an external dust such as a muddy water or the like in the machine outer side B. Both of the seal lips 14 and 15 seal the oil or the dust by slidably coming into close contact with a peripheral surface of the shaft 33.

Further, the first seal member 11 is structured in its part construction such that a rubber-like elastic body 17 is attached (vulcanization bonded) to a metal ring 16 in which an inward flange section 16b is integrally formed in an end section in the machine outer side of a tubular section 16a, and a plurality of seal lips 14 and 15 are integrally formed by the rubber-like elastic body 17 together with an outer peripheral seal section 18 which seals between the metal ring 16 and the housing 31. A garter spring 19 for regulating a fastening margin is fitted as a third part to the main lip 14.

On the other hand, the second seal member 21 has a tabular and annular end surface covering section 22 which covers the end surface section (the upper surface section) 31a of the housing 31 from the above (the machine outer side B), and an annular outer peripheral insertion section 23 inserted to an outer peripheral surface 31b of the housing 31 from the above is integrally provided in an outer peripheral edge section of the end surface covering section 22. A stepped engagement section 36 is provided as a part of an annular groove 37 in the outer peripheral surface 31b of the housing 31. An inner peripheral surface of the outer peripheral insertion section 23 is integrally provided with a projection section 24 for preventing the second seal member 21 from coming off from the housing 31 by engaging with the stepped engagement section 36. Further, an inner peripheral edge section of the end surface covering section 22 is integrally provided with an annular inner peripheral insertion section 25 which is inserted to an inner peripheral surface of the shaft hole 32 in the housing 31 from the above. Further, in the same manner, a second dust lip 26 is integrally provided in the machine outer side B of the inner peripheral insertion section 25 in an inner peripheral edge section of the end surface covering section 22, the second dust lip 26 being positioned in the machine outer side B of the first dust lip 15, slidably coming into close contact with a peripheral surface of the shaft 33 and sealing the foreign material such as the muddy water in the machine outer side B.

An outer peripheral surface of the outer peripheral insertion section 23 is integrally provided with a third dust lip 27 which slidably comes into close contact with an inner peripheral surface of a skirt section in the dust cover 35 so as to seal the foreign material such as the muddy water in the machine outer side B. The third dust lip 27 is formed such that a lip leading end is directed downward on the contrary to the first and second dust lips 16 and 26, since a gap 38 between the dust cover 35 and the housing 31 is set below the third dust lip 27 and the muddy water or the like enters from the gap 38.

The second seal member 21 is constructed by an integrally formed product of the rubber-like elastic body 28, however, a metal ring 29 is embedded at a position from the end surface covering section 22 toward the inner peripheral insertion section 25 so as to enhance a strength of the second seal member. The metal ring 29 is structured such that an outward flange section 29b is integrally formed in a machine outer side end section of a tubular section 29a, and the tubular section 29a positioned in an outer peripheral surface of the inner peripheral insertion section 25 is fitted to an inner peripheral surface of the shaft hole 32 with a predetermined fastening margin.

In the oil seal 1 having the structure mentioned above, since the dust cover 35 is installed to the above of the housing 31, the external dust such as the muddy water existing in the machine outer side B is first of all made hard to enter into the machine inner side A. The muddy water entering from the gap 38 between the dust cover 35 and the housing 31 is sealed by the third dust lip 27, is further sealed by the second dust lip 26, and does not reach the first dust lip 15 until passing through both the dust lips 27 and 26. The muddy water or the like blocked by the second dust lip 26 flows down along the outer peripheral surface of the outer peripheral insertion section 23 without being piled up on the second seal member 21, and may flow out of the gap 38 to the external section via the third dust lip 27. Therefore, the muddy water or the like is hard to reach the first dust lip 15. Accordingly, it is possible to inhibit the muddy water or the like from being piled up on the first dust lip 15, inhibit the muddy water entering from the first dust lip 15 from biting into the main lip 14 and inhibit the oil leakage from being generated.

Further, since the second seal member 21 is constructed by the integrally formed product of the rubber-like elastic body 28, and is structured such that the metal ring 29 is embedded into the inner peripheral insertion section 25 and the metal ring 29 is fitted to the inner peripheral surface of the shaft hole 32, it is possible to stabilize an affixing property of the second seal member 21 in relation to the housing 31. In other words, it is possible to strongly and firmly fix the second seal member 21 to the housing 31. Further, since the projection section 24 provided in the inner peripheral surface of the outer peripheral insertion section 23 engages with the stepped engagement section 36 provided in the outer peripheral surface of the housing 31, the second seal member 21 is hard to fall away from the housing 31. In this case, in an illustrated installed state, the inner peripheral insertion section 25 may be structured such that a lower end section thereof is extended downward so as to be brought into close contact with the first seal member 11, thereby securing a sealing performance of the section. Further, the end surface covering section 22 may be structured such that an upper surface thereof is formed as a taper shape and the muddy water tends to flow to the outer peripheral side.

Second Embodiment

In the first embodiment mentioned above, the second seal member 21 is constructed by the integrally formed product of the rubber-like elastic body 28 and is structured such that the metal ring 29 is embedded at the position from the end surface covering section 22 toward the inner peripheral insertion section 25 so as to enhance the strength thereof, however, in a second embodiment, the metal ring 29 may be omitted as shown in FIG. 2. In this case, the second seal member 21 is formed only by an integrally formed product of the rubber-like elastic body 28. In this case, it is possible to reduce a manufacturing cost in the second seal member 21 although a strength thereof is slightly reduced. Further, since a flexibility of the parts is enhanced, it is possible to easily carry out an installing work. The other structures and operational effects of the second embodiment are the same as those of the first embodiment. Further, the parts sealing performance may be secured by bringing the lower end section of the inner peripheral insertion section 25 into close contact with the first seal member 11, and the upper surface of the end surface covering section 22 may be formed as the taper shape so as to make the muddy water easily flow to the outer peripheral side, in the same manner as the first embodiment.

What is claimed is:

1. An oil seal comprising:

a first seal member which is installed to an inner periphery of a shaft hole in a housing inserting a shaft thereto; and a second seal member which is installed to an end surface section of said housing in an opening peripheral edge section of said shaft hole, wherein said first seal member integrally has an affixation section which is fitted to an inner peripheral surface of the shaft hole in said housing, a main lip which slidably comes into close contact with a peripheral surface of said shaft so as to seal a sealed fluid in an inner side of the machine, and a first dust lip which slidably comes into close contact with the peripheral surface of said shaft so as to seal a foreign material in the outer side of the machine, wherein said second seal member integrally has an end surface covering section which covers the end surface section of said housing, an outer peripheral insertion section which is inserted from one side in an axial direction to an outer peripheral surface of said housing and is engaged with a stepped engagement section provided in the outer peripheral surface of said housing so as to prevent said second seal member from coming off from said housing, an inner peripheral insertion section which is inserted to the inner peripheral surface of the shaft hole in said housing from one side in the axial direction, and a second dust lip which slidably comes into close contact with a peripheral surface of said shaft in the outer side of the machine in said first dust lip so as to seal the foreign material in the outer side of the machine, and wherein an outer peripheral surface of said outer peripheral insertion section in said second seal member is integrally provided with a third dust lip which slidably comes into close contact with an inner peripheral surface of a dust cover affixed to said shaft so as to seal the foreign material in the outer side of the machine.

2. The oil seal according to claim 1, wherein an inner peripheral surface of said outer peripheral insertion section in said second seal member is integrally provided with a projection section for preventing said second seal member from coming off from said housing by engaging with a stepped engagement section provided in the outer peripheral surface of said housing.

* * * * *